United States Patent [19]
Wayne

[11] Patent Number: 4,996,442
[45] Date of Patent: Feb. 26, 1991

[54] COMBINATION HOODSCOOP AND TACHOMETER

[76] Inventor: Mark Wayne, 29436 Briarbank Ct., Southfield, Mich. 48034

[21] Appl. No.: 308,810

[22] Filed: Feb. 9, 1989

Related U.S. Application Data

[63] Continuation-in-part of Ser. No. 201,328, May 27, 1988, abandoned, which is a continuation-in-part of Ser. No. 4,616, Jan. 20, 1987, abandoned.

[51] Int. Cl.$^5$ .................. B60K 11/00; B60K 37/00
[52] U.S. Cl. .................. 307/10.100; 180/68.100; 340/466; 340/459; D12/173; D12/192
[58] Field of Search .................. 307/10.1, 10.8, 120; 180/68.1, 69.2, 69.21, 90; 340/441, 457, 457.2, 457.3, 463, 465, 466, 468, 472, 473, 475; 116/28 R, 35 R, 35 A, 36, 37, 62.1, 62.3, 62.4; D12/173, 190, 192, 196, 197

[56] References Cited

U.S. PATENT DOCUMENTS

| | | | |
|---|---|---|---|
| D. 198,277 | 5/1964 | Breda | D52/6 |
| 1,865,777 | 7/1932 | McManaman . | |
| 2,771,524 | 11/1956 | Fischer | 200/56 |
| 2,831,176 | 4/1958 | Liberto | 340/74 |
| 3,445,741 | 5/1969 | Gerber | 318/138 |
| 3,550,076 | 12/1970 | Kent | 349/22 |
| 3,855,572 | 12/1974 | Olson | 340/325 X |
| 4,041,782 | 8/1977 | Hingst | 73/493 |
| 4,456,903 | 6/1984 | Kishi et al. | 180/78 X |
| 4,515,033 | 5/1985 | Carlo | 74/476 |
| 4,588,267 | 5/1986 | Pastore | 350/600 |
| 4,629,022 | 12/1986 | Wayne et al. | 180/69.22 |

*Primary Examiner*—A. D. Pellinen
*Assistant Examiner*—David Osborn
*Attorney, Agent, or Firm*—Gifford, Groh, Sprinkle, Patmore and Anderson

[57] ABSTRACT

A hoodscoop for attachment to a motor vehicle hood. The hoodscoop has a rear facing surface visible to the driver which is equipped with indicating instruments such as a tachometer, a pair of directional signal indicators, a pair of parking lamp indicators and a pair of high-beam headlamp indicators that are visible to the driver without taking his eyes off the road. The hoodscoop can have a removable back plate so that it can be alternatively a decorative panel or contain the indicating instruments.

23 Claims, 4 Drawing Sheets

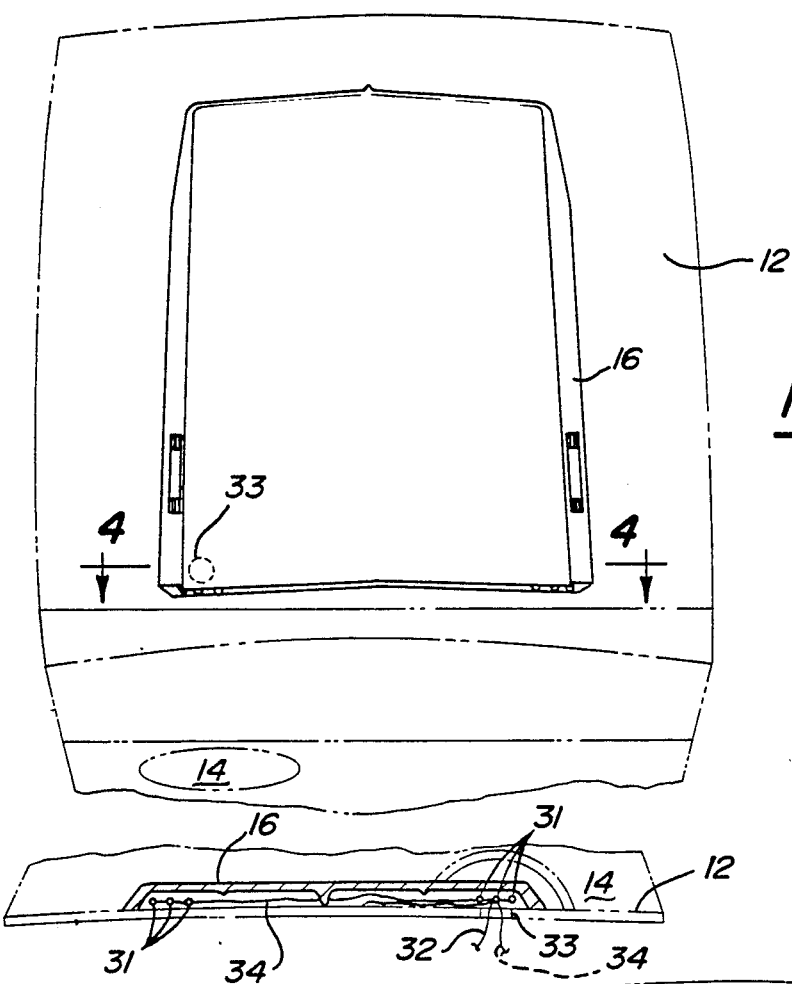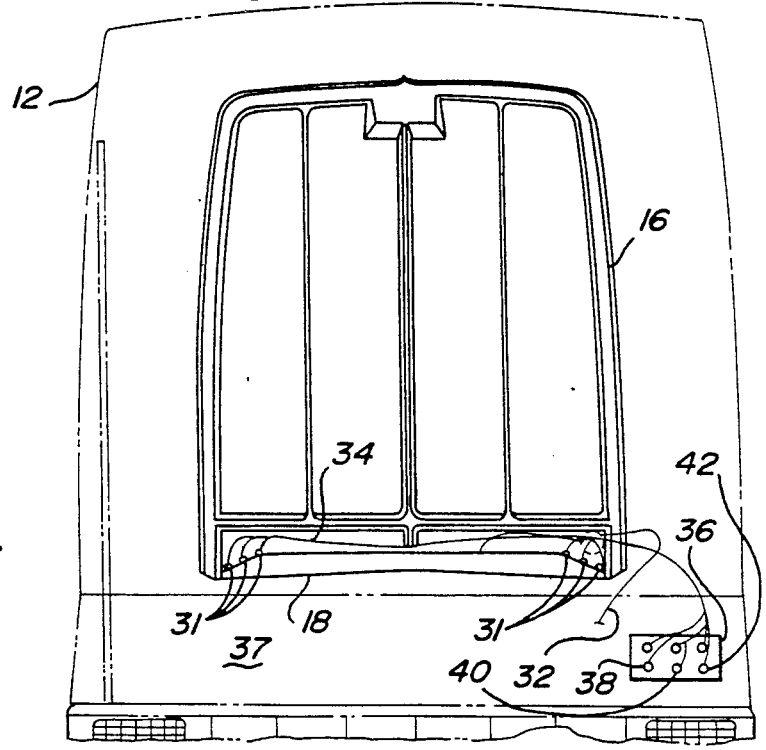

COMBINATION HOODSCOOP AND TACHOMETER

CROSS REFERENCE TO RELATED APPLICATIONS

The present application is a continuation-in-part of application Ser. No. 201,328 filed May 27, 1988, which is in turn a continuation-in-part of application Ser. No. 004,616 filed Jan. 20, 1987, both abandoned.

BACKGROUND OF THE INVENTION

I. Field of the Invention

The present invention relates to indicating devices carried by an automobile, and more particularly to a mount for instruments such as a tachometer, directional signal, parking lamp indicator, high-beam headlamp indicator or the like.

II. Description of the Prior Art

It has long been required to position directional or turn signals, headlamps or the like upon the exterior of motor vehicles. In the past, operation of these signals or indicators has been conventionally monitored by a corresponding indicator or instrument visible to the driver and positioned, for example, on the vehicle dashboard. Often a plurality of such instruments are gathered into a cluster located above the steering wheel shaft. Instrument clusters of this type often include a tachometer, a speedometer and an odometer.

One drawback of prior vehicle operation instruments has been that the driver is often required to move the eyes in substantial angular distance from the road in order to observe the status of operation of signals displayed by the instruments. Of course, it is particularly dangerous to remove the eyes from the road during periods of acceleration, either linear or during turning, passing or the like, which necessarily require the driver's greatest attention.

Another drawback of prior vehicle instruments has been the difficulty of maintaining and repairing them. For example, some instruments are lamps, which display the status of operation of the associated vehicle signal by being lit or not. Such lamps are, of course, subject to burnout, and it is at best troublesome to change such burned out lamp bulbs when confronted with the mass of wires and sockets present in the dark confines behind a conventional dashboard.

SUMMARY OF THE PRESENT INVENTION

The present invention overcomes these and other drawbacks by providing an instrument display for acceleration-critical vehicle function indicators, which requires minimal removal of the driver's eyes fom the road in order to observe the displays. The present invention first comprises a hoodscoop affixed to the hood of a motor vehicle. The hoodscoop has a portion defining a surface visible from the driver's locus, typically a driver's seat, and at least one indicating instrument mounted on that surface in a position visible from the driver's locus. The present invention also includes means for transmitting vehicle operating data to the instrument, such that the instrument povides a display of data visible from the driver's locus. The instruments preferably comprise a tachometer, a directional turn signal indicator, a parking lamp indicator and a high-beam headlamp indicator. The tachometer is preferably of the type comprising a plurality of illuminated panels disposed in a linear array across the driver's line of sight. An increasing number of panels become lit as the engine speed measured by the tachometer (typically in RPM) increases. Preferably, the panels are illuminated in a plurality of colors coresponding to low, medium and high ranges of engine speed.

In a particularly preferred embodiment of the present invention, a plurality of indicator lamps corresponding to actuation of the directional signals, parking lamps and high-beam headlamps are located externally to the hoodscoop. A plurality of fiber-optic tubes operatively connect the indicator lamps to display lenses mounted on the hoodscoop surface. These indicator lamps can be detachably affixed to the underside of the hood, adjacent to the hoodscoop, or can be contained within the engine compartment of the vehicle. In either case, the hoodscoop does not need to be demounted from the hood during replacement of the indicator lamps or checking of the electrical connections to them, significantly decreasing the time and effort necessary to maintain the instruments in an operating condition.

The tachometer and other indicators are thus preferably of the kind having high peripheral perceptability, so that significant information can be obtained from their displays without requiring removal of the driver's eyes from the road at all. In any event, provision of the instruments on the hoodscoop locates these acceleration-critical instruments closer to the driver's line of sight to the road than occurs with a conventional instrument cluster on a dashboard.

In another embodiment of the present invention, a hoodscoop is disclosed which includes an interchangable plate which may either be provided as a blank piece, or may include a brand name or vehicle style printed thereon, or may further be a piece provided with a tachometer or indicator lamps such as turn signals or a temperature indicator.

BRIEF DESCRIPTION OF THE DRAWING

A better understanding of the present invention will now be had upon reference to the following detailed description, when read in conjunction with the accompanying drawing, wherein like reference characters refer to like parts throughout the several views, and in which:

FIG. 3 is a top view of the preferred embodiment of the present invention;

FIG. 4 is a cross-sectional view taken along line 4—4 of FIG. 3;

FIG. 5 is a bottom perspective view of the preferred embodiment of the present invention;

DETAILED DESCRIPTION OF THE PREFERRED EMBODIMENTS OF THE PRESENT INVENTION

Figure 1:
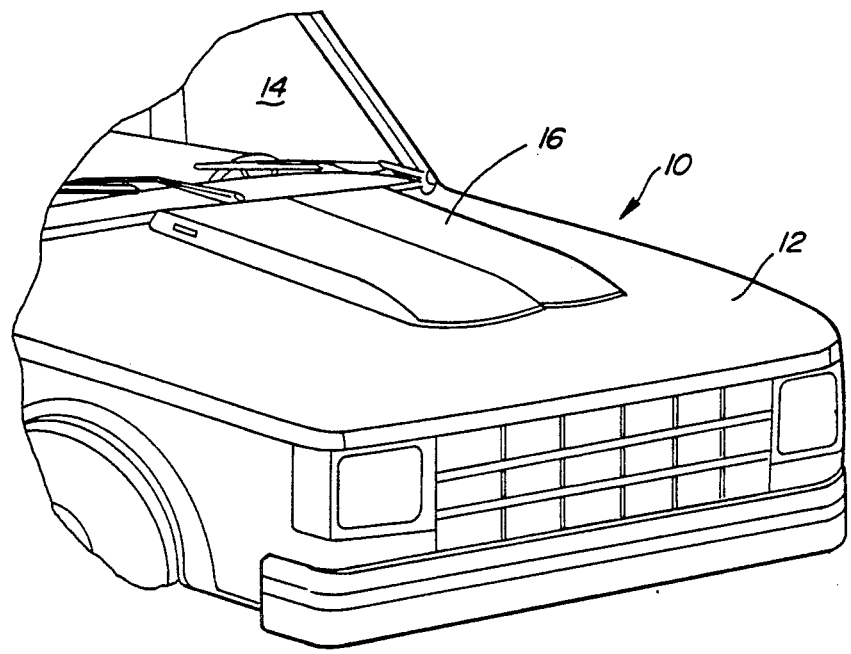
FIG. 1 is a front perspective view of the preferred embodiment of the present invention.

With reference first to FIG. 1, the combination hoodscoop and tachometer of the present invention is there-shown disposed on a hood 12 of a motor vehicle 10. As is conventional, a driver's seat or locus 14 is provided in the interior of the vehicle 10.

Figure 2:
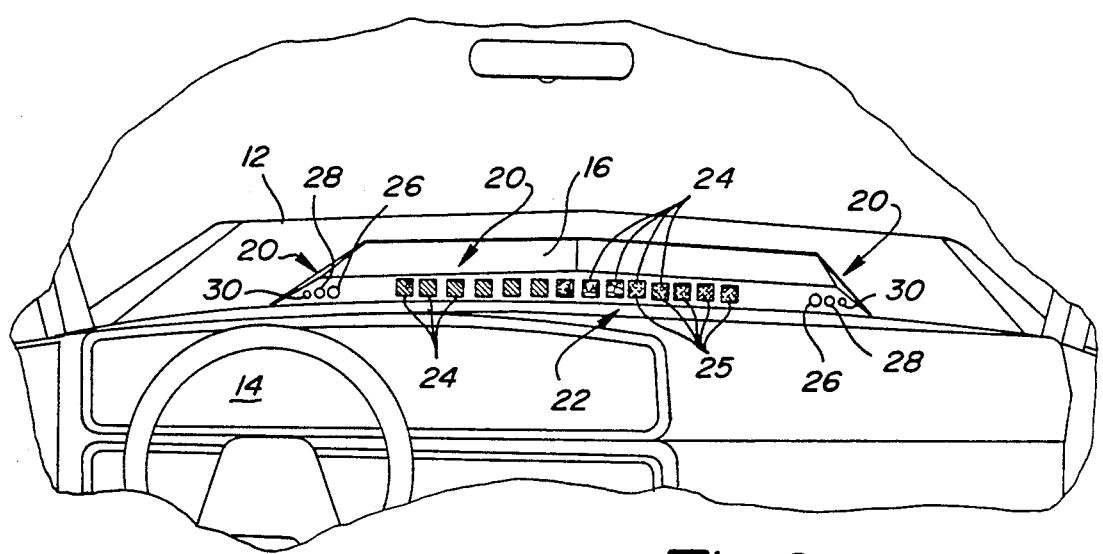
FIG. 2 is a rear perspective view of the preferred embodiment of the present invention.

With reference now to FIG. 2, the combination of the present invention first comprises a hoodscoop 16 affixed to the vehicle head 12. The hoodscoop 16 is preferably constructed from a urethane plastic, and is advantageously a decorative rather than operative hoodscoop. Most advantageously, the hoodscoop 16 can be of the type described in U.S. Pat. No. 4,629,022 to Mark Wayne et al and affixed to the hood 12 in the fashion described in that application. In any case, the hoodscoop 16 includes a portion defining a surface 18 visible to the driver from the driver locus 14.

As shown in FIGS. 2 and 3, a plurality of data-displaying instruments 20 are mounted on the surface 18 in a position visible from the driver locus 14. Preferably, the plurality of instruments 20 first includes a tachometer 22 comprising a linear array of panels 24 which are sequentially illuminable in correspondence with the vehicle engine speed measured by the tachometer 22. Preferably, the panels illuminate from left to right, lighting for each increment of 500 RPM from 0 to 7,000 RPM, the panels corresponding to a lower rotational speed remaining lit while the higher panels are lit as speed increases. Preferably, the panels 24 are constructed from conventional devices as light emitting diodes, back-lit liquid crystal diodes, or luminous gas discharge devices. Also preferably, at least one of the panels 24, such as the right hand panels 25, display a color different from the others of the panels 24, in correspondence with a normal or optimal engine rotational speed, for example, 4,500 RPM.

The plurality of indicating instruments 20 also includes a directional signal indicator 26, a parking lamp indicator 28 and a high-beam headlamp indicator 30. Preferably, these instruments 26, 28 and 30 comprise a plurality of lenses 31 mounted on the hoodscoop surface 18, so as to provide an on-off display when the corresponding signal or lamp is actuated.

The tachometer 22 is preferably operatively connected to the engine by a wire and sensor 32 running beneath the hoodscoop 16 (FIGS. 4 and 5) and out a hole 33 in the hood 12. The lenses 31 of the indicators 26, 28 and 30 are each connected to their own optical fiber tube 34 disposed parallel to the tachometer wire 32 through the same hole 33 in the hood 12. The optical fiber tube 34 runs to a lamp box 36 disposed in the engine compartment 37 beneath the hood 12. Alternatively, the lamp box 36 can be affixed to the underside of the hood 12. A plurality of lamps 38, 40 and 42 corresponding to the instruments 26, 28 and 30 are disposed interiorly of the box 36 and are detachably secured to the vehicle 10 by, for example, conventional lamp sockets. The lamps 38, 40 and 42 are actuated upon operation of the corresponding turn or directional signal, the parking lamps and high-beam headlamps, respectively, so that light from the lamps traverses the fiber-optic tubes 34, illuminating the corresponding lenses 31. Because the lenses 31 are disposed on the surface 18 of the hoodscoop 16, they are visible to a driver situated at the drive locus 14, and serve as indicators of the operational status of the vehicle.

The apparatus of the present invention is easy to operate in the manner previously described. The combination of the present invention is advantageous over the prior art in that it minimizes the distance a driver's eyes must be drawn from the road in order to perceive instrument displays corresponding to several of the acceleration-critical operating parameters of the vehicle. Tachometer display of engine speed is significant for linear acceleration and passing, and turn indicators are significant for assuring others of vehicle travel during a turn (necessarily involving lateral acceleration) while the high-beam headlamps are conventionally flashed at a car about to be overtaken by a passing and accelerating vehicle.

Moreover, not only does the present invention increase the safety with which a vehicle can be operated, the use of fiber optics as a means for transporting data or a signal to the indicating lenses 31 permits the lamps 38, 40 and 42 providing the signal to be readily changed without demounting the hoodscoop from the vehicle hood. Most advantageously, the combination hoodscoop and tachometer can be installed as an after-market device on an existing vehicle with little modification. Significantly, the lenses 31 and fiber-optic tubes 34 are inherently low maintenance devices, which can if desired be embedded in the hoodscoop replacing the wires and lamps conventionally employed in instrument clusters.

Of course, several modifications to the combination can be made. For example, the lamps 38, 40 and 42 can be omitted when the instruments 26, 28 and 30 are intended to display the operation status of signal lamps or lights on the exterior of the vehicle. In such a case, the fiber-optic tube 34 can run from the lens 31 to an area adjacent to and lit by the signal light or lamp. The display by the indicators 26, 28 and 30 can thus be a display of the actual operation of the signal or light, and not merely an indication of the actuation of a circuit associated with the signal or light. Similarly, the tachometer can be actuated by remote lamps and fiber-optic tubes as well. In such a case, the panels 24 can be constructed from a translucent plastic, and light from a plurality of lamps would then be allowed to pass through a similarly plurality of fiber-optic tubes to illuminate the individual plastic panels 24.

Figure 6:
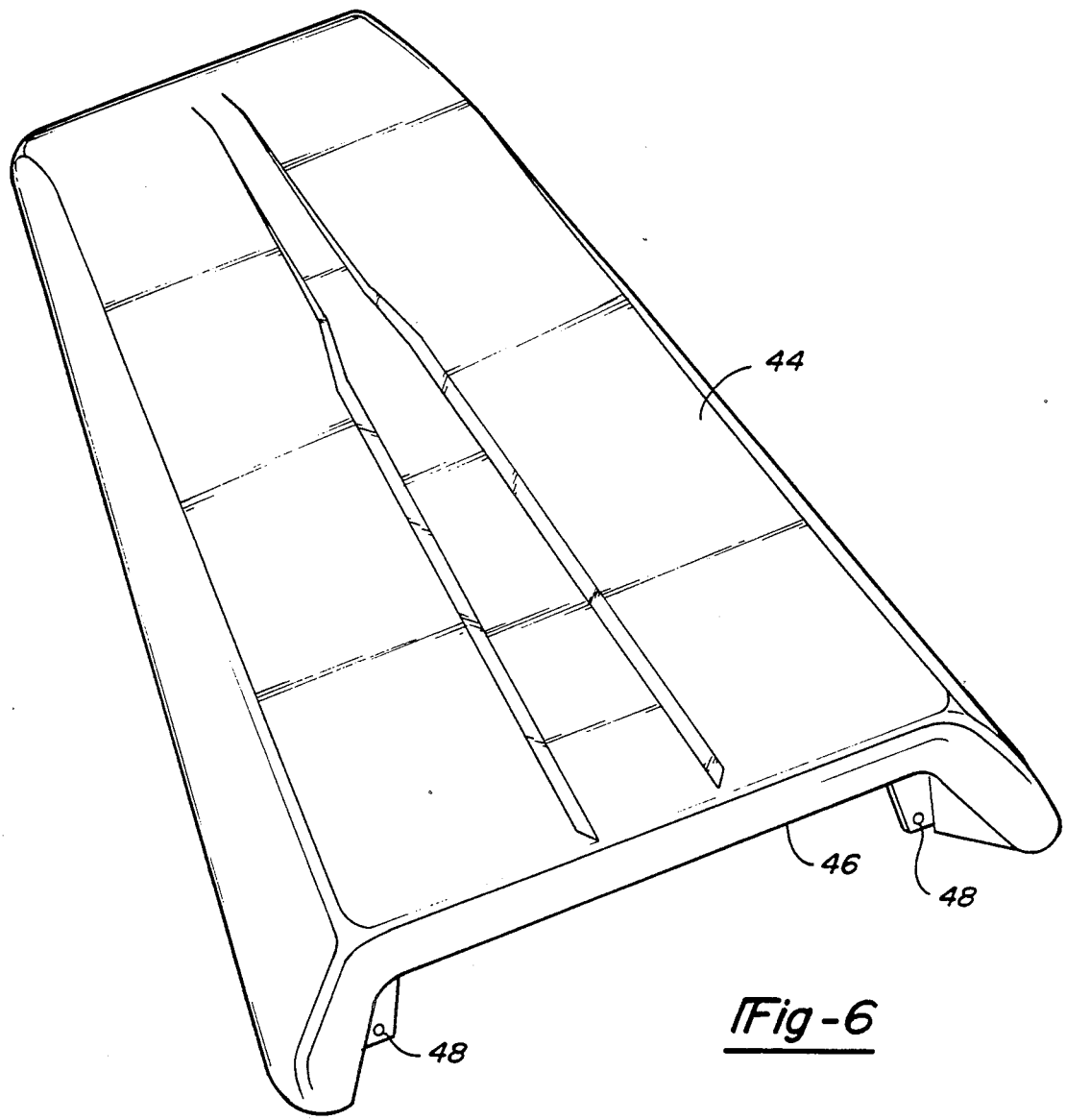
FIG. 6 is a rear perspective view of another embodiment of the present invention.

With reference to FIG. 6, an alternate embodiment of the present invention is disclosed. In this embodiment, a hoodscoop 44 is illustrated. The hoodscoop 44 may be composed of a polymerized material for easy manufacture and installation. The hoodscoop 44 is installed in much the same way as the hoodscoop 16 discussed in relation to FIGS. 1–5 above. However, hoodscoop 44 offers the added versatility of being usable with or without an instrument readout. An apertured area, generally indicated as 46, is provided for a plate which will be described hereafter with respect to FIGS. 7 and 8.

Still with reference to FIG. 6, a pair of fastening apertures 48 are provided for fixing the plate described below.

Figure 7:
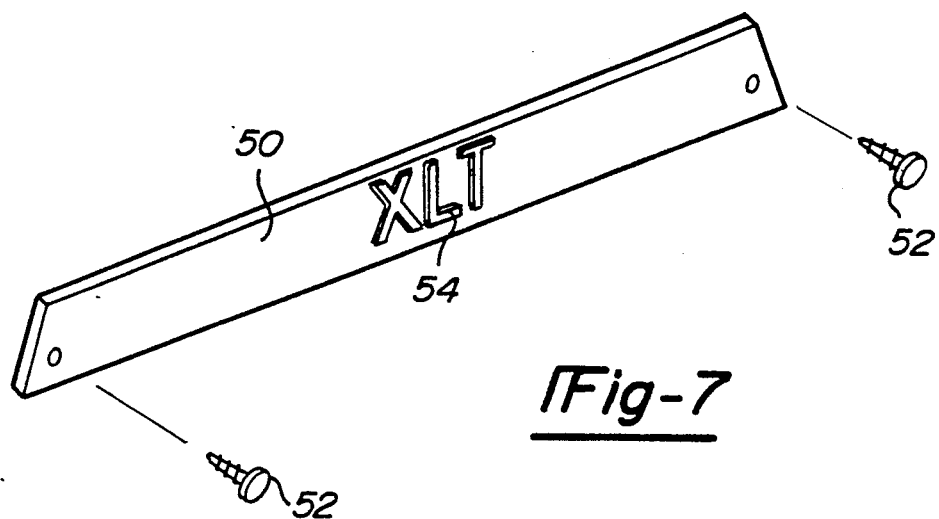
FIG. 7 is a perspective view of an insert for application to the embodiment of the present invention disclosed in FIG. 6.

With reference to FIG. 7, an insertable plate 50 is illustrated. The plate 50 is insertable into the apertured area 46 of the hoodscoop 44 and is fastenable therein by a pair of fasteners 52 are conventional, although it is to be understood that other fasteners would be usable.

The plate 50 is illustrated as having letters 54 appearing thereon. Of course, the plate 50 may be provided in blank, or may have a vehicle brand name or type appearing thereon. The plate 50 may be left off altogether.

Figure 8:
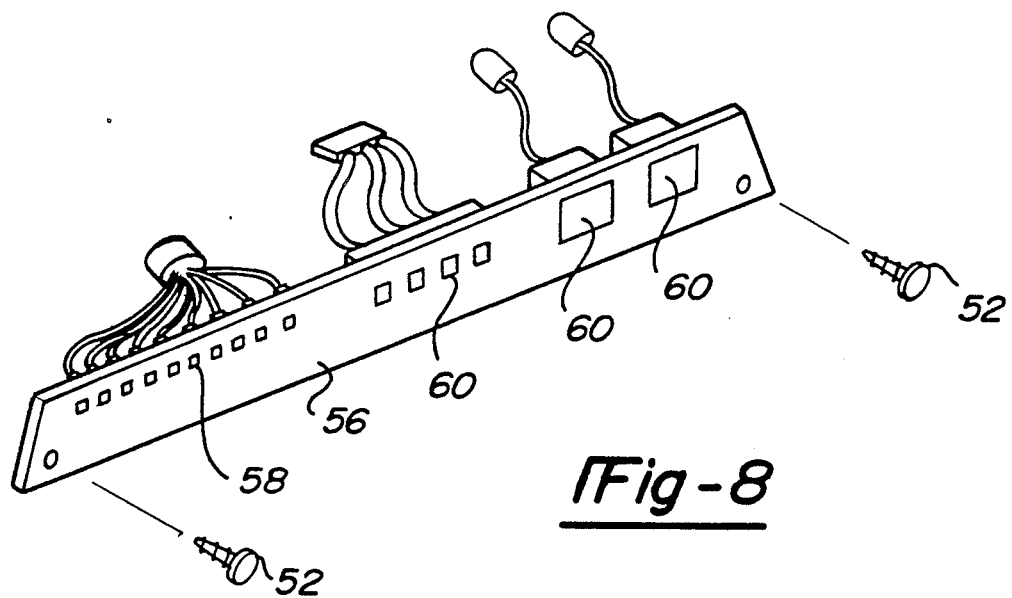
FIG. 8 is an alternate insert of FIG. 7.

With reference to FIG. 8, a plate 56 is illustrated. According to this embodiment, the plate 56 is provided with a variety of instrument gauges 58 and indicators 60. If the plate 56 is selected, its functions and characteristics would be substantially similar to those disclosed above with respect to FIGS. 1–5.

Having described my invention, however, many modifications thereto will become apparent to those skilled in the art to which it pertains, without deviation from the spirit of the invention, as defined by the scope of the appended claims.

I claim:

1. In combination, a motor vehicle having a hood and a driver locus;
    a plastic hoodscoop affixed to said hood having a rear-facing portion visible from said locus; and
    a removably insertable plate extending over substantially the entire rear-facing portion.

2. The combination according to claim 1 wherein said removably insertable plate is plain.

3. The combination according to claim 1 wherein said removably insertable plate is removably fastenable to said hoodscoop by means of removable fasteners.

4. The combination according to claim 1 wherein said removably insertable plate has a vehicle name printed thereon.

5. The combination according to claim 1 wherein said removably insertable plate has a vehicle type printed thereon.

6. The combination according to claim 1 wherein said removably insertable plate has printing provided thereon.

7. The combination according to claim 1 wherein said removably insertable plate includes at least one instrument for providing a display of data.

8. The combination according to claim 7 wherein said at least one instrument additionally comprises a tachometer and at least one of a directional signal indicator, a parking lamp indicator and a high-beam indicator.

9. The combination according to claim 1 further comprising:
    a plurality of indicating instruments mounted on said removably insertable plate at locations visible from said driver locus, said instruments comprising a tachometer, a pair of directional signal indicators, a pair of parking lamp indicators and a pair of high-beam headlamp indicators; and
    means for transmitting vehicle operating data to said instruments;
    wherein said instruments provide displays of said data visible from said driver locus;
    wherein said data transmitting means comprises at least one indicator lamp, means for detachably securing said indicator lamp to said lower hood surface, and a fiber-optic tube operatively connecting said lamp to one of said instruments; and
    wherein said tachometer comprises a plurality of linearly arranged and sequentially illuminable but visually distinguishable panels, a differing number of lit panels corresponding to values of engine RPM differing by 500 RPM, and at least one of said panels displaying a color different from others of said panels so as to indicate a preferred normal value of engine RPM.

10. In combination a motor vehicle having a hood and a driver locus;
    a plastic hoodscoop affixed to said hood, said hoodscoop having a portion defining a surface visible from said locus;
    at least one indicating instrument comprising a tachometer mounted on said surface in a position visible from said locus; and
    means for transmitting vehicle operating data to said at least one instrument;
    wherein said at least one instrument provides a display of said data, visible from said locus.

11. The combination according to claim 10, wherein said at least one instrument additionally comprises at least one of a directional signal indicator, a parking lamp indicator and a high-beam headlamp indicator.

12. The combination according to claim 11, wherein said data transmitting means comprises an indicator lamp, means for detachably securing said lamp to said vehicle external to said hoodscoop, and a fiber-optic tube operatively connecting said lamp and said instrument.

13. The combination according to claim 12, wherein said hood includes a lower hood surface not visible from said locus, and said combination additionally comprises means for detachably securing said indicator lamp to said lower hood surface.

14. The combination according to claim 12, wherein said combination further comprises means for detachably securing said indicator lamp to said vehicle beneath said hood.

15. The combination according to claim 12, wherein said indicator lamp comprises a directional signal of said vehicle.

16. The combination according to claim 10, wherein said at least one instrument is of the type providing a peripherally perceptible display of said data during operation.

17. The combination according to claim 16, wherein said at least one instrument is of the type possessing a display with two conditions: an illuminated condition and a nonilluminated condition.

18. The combination according to claim 10, wherein said tachometer is of a type comprising at least one of a light-emitting diode, a liquid crystal diode, and luminous gas discharge device.

19. The combination according to claim 10, wherein said tachometer is of the type comprising a plurality of sequentially illuminable but visually distinguishable panels, a differing number or pattern of lit panels corresponding to differing values of said data from said tachometer.

20. The combination according to claim 19, wherein said tachometer comprises a linear array of said panels, each sequential panel in said array corresponding to an increase of 500 RPM measured by said tachometer.

21. The combination according to claim 19, wherein said panels light in correspondence with values of 0 to 7,000 RPM measured by said tachometer.

22. The combination according to claim 19, wherein at least one of said panels displays a color different from the others of said panels corresponding to at least a normal operating value measured by said tachometer.

23. The combination according to claim 10, wherein said hoodscoop is constructed of a urethane material.

* * * * *